(12) United States Patent
Shanbhag et al.

(10) Patent No.: US 9,811,954 B2
(45) Date of Patent: Nov. 7, 2017

(54) NEAR-TO-EYE DISPLAY SYSTEMS AND METHODS FOR VERIFYING AIRCRAFT COMPONENTS

(71) Applicant: HONEYWELL INTERNATIONAL INC., Morristown, NJ (US)

(72) Inventors: Vasudev Prakash Shanbhag, Karnataka (IN); Mahesh Babu N, Karnataka (IN); Suresh Bazawada, Karnataka (IN)

(73) Assignee: HONEYWELL INTERNATIONAL, INC., Morris Plains, NJ (US)

( * ) Notice: Subject to any disclaimer, the term of this patent is extended or adjusted under 35 U.S.C. 154(b) by 0 days.

(21) Appl. No.: 14/557,845

(22) Filed: Dec. 2, 2014

(65) Prior Publication Data
US 2016/0152351 A1    Jun. 2, 2016

(51) Int. Cl.
*G09G 5/00* (2006.01)
*G02B 27/01* (2006.01)
(Continued)

(52) U.S. Cl.
CPC ......... *G07C 5/12* (2013.01); *G02B 27/0093* (2013.01); *G02B 27/017* (2013.01);
(Continued)

(58) Field of Classification Search
USPC ..... 701/14, 33.2, 15–16, 519, 523; 345/632, 345/634, 7–8; 340/951, 959
See application file for complete search history.

(56) References Cited

U.S. PATENT DOCUMENTS 2,677,119 A * 4/1954 Luck .................... G08G 5/0013
370/525
3,115,634 A * 12/1963 Karpeles .................. G01S 1/02
342/413
(Continued)

FOREIGN PATENT DOCUMENTS

CN 105718230 A * 6/2016 ..... G02B 2027/0127
EP 2357626 A1 8/2011
(Continued)

OTHER PUBLICATIONS

Single and multi-user head tracked glasses-free 3D displays; Surman, P.; Day, S.; Aksit, K.; Urey, H.; Benjamin, J.; Jain, K.; Hao Chen; 3DTV-Conference: The True Vision-Capture, Transmission and Dispaly of 3D Video (3DTV-CON), 2013; Year: 2013 pp. 1-4, DOI: 10.1109/3DTV.2013.6676654.*
(Continued)

*Primary Examiner* — Cuong H Nguyen
(74) *Attorney, Agent, or Firm* — Lorenz & Kopf, LLP

(57) ABSTRACT

Systems and methods are disclosed for verifying a vehicle component. In various embodiments, a system for verifying a vehicle component may comprise a near-to-eye (NTE) display system that includes an NTE tracking controller, a controller communicatively coupled to the NTE tracking controller, and a component database communicatively coupled to the controller. The controller may be configured to receive component data from the component database and communicate the component data to the NTE tracking controller based upon focus data, where the focus data is based upon a head position of an operator.

10 Claims, 7 Drawing Sheets

(51) Int. Cl.
*G07C 5/12* (2006.01)
*G07C 5/08* (2006.01)
*G02B 27/00* (2006.01)

(52) U.S. Cl.
CPC ..... *G02B 27/0172* (2013.01); *G02B 27/0179* (2013.01); *G07C 5/0808* (2013.01); *G02B 2027/014* (2013.01); *G02B 2027/0127* (2013.01); *G02B 2027/0141* (2013.01); *G02B 2027/0187* (2013.01)

(56) References Cited

U.S. PATENT DOCUMENTS

| | | | | |
|---|---|---|---|---|
| 8,026,834 | B2 * | 9/2011 | Larson | G01C 23/005 340/945 |
| 8,294,633 | B2 | 10/2012 | Cernasov | |
| 8,319,665 | B2 | 11/2012 | Weinmann et al. | |
| 8,350,726 | B2 * | 1/2013 | Mathan | G01C 23/005 340/947 |
| 8,363,100 | B2 * | 1/2013 | Lu | G02B 27/2264 348/117 |
| 8,416,152 | B2 * | 4/2013 | Larson | G02B 27/017 345/8 |
| 8,487,787 | B2 * | 7/2013 | Best | G02B 27/0093 340/933 |
| 8,552,850 | B2 | 10/2013 | DeMers et al. | |
| 8,736,464 | B1 | 5/2014 | Downs Mullen | |
| 8,907,887 | B2 * | 12/2014 | Larson | G02B 27/01 345/156 |
| 8,963,804 | B2 * | 2/2015 | Larson | G02B 27/017 345/8 |
| 9,087,058 | B2 * | 7/2015 | Neven | G06F 17/30864 |
| 2009/0284552 | A1 * | 11/2009 | Larson | G02B 27/01 345/632 |
| 2009/0303082 | A1 * | 12/2009 | Larson | G01C 23/005 340/945 |
| 2009/0325131 | A1 | 12/2009 | Cernasov et al. | |
| 2010/0109975 | A1 * | 5/2010 | Larson | G02B 27/017 345/8 |
| 2010/0123839 | A1 * | 5/2010 | Lu | G02B 27/2264 349/15 |
| 2011/0221896 | A1 * | 9/2011 | Haddick | G02B 27/017 348/143 |
| 2012/0200601 | A1 * | 8/2012 | Osterhout | G02B 27/0093 345/633 |
| 2012/0206323 | A1 | 8/2012 | Osterhout et al. | |
| 2012/0249797 | A1 * | 10/2012 | Haddick | G06F 1/163 348/158 |
| 2013/0162632 | A1 | 6/2013 | Varga et al. | |
| 2017/0076057 | A1 * | 3/2017 | Burton | G06F 19/322 |

FOREIGN PATENT DOCUMENTS

| | | | | |
|---|---|---|---|---|
| EP | 3029510 A2 * | 6/2016 | | G02B 27/0093 |
| WO | 2013049248 A2 | 4/2013 | | |

OTHER PUBLICATIONS

Data mining for gaze tracking system; Heidenburg, B.; Lenisa, M.; Wentzel, D.; Malinowski, A.; Human System Interactions, 2008 Conference on; Year: 2008; pp. 680-683, DOI: 10.1109/HSI.2008. 4581522.*

A Multi-Gesture Interaction System Using a 3-D Iris Disk Model for Gaze Estimation and an Active Appearance Model for 3-D Hand Pointing; Reale, M.J.; Canavan, S.; Lijun Yin; Kaoning Hu; Hung, T.; Multimedia, IEEE Transactions on; Year: 2011, vol. 13, Issue: 3; pp. 474-486, DOI: 10.1109/TMM.2011.2120600.*

Tracking and optimal control problems in human head/eye coordination; Wijayasinghe, I.; Aulisa, E.; Ghosh, B.K.; Glasauer, S.; Kremmyda, O.; American Control Conference (ACC), 2013; Year: 2013; pp. 2283-2289, DOI: 10.1109/ACC.2013.6580174.*

Potential and Optimal Target Fixating Control of the Human Head/Eye Complex; Wijayasinghe, I.B.; Aulisa, E.; Buttner, U.; Ghosh, B.K.; Glasauer, S.; Kremmyda, O.; Control Systems Technology, IEEE Transactions on; Year: 2015, vol. 23, Issue: 2 pp. 796-804, DOI: 10.1109/TCST.2014.2335115.*

Eye Control System Base on Ameliorated Hough Transform Algorithm; Jianbin Xiong; Weichao Xu; Wei Liao; Qinruo Wang; Jianqi Liu; Qiong Liang; Sensors Journal, IEEE; Year: 2013, vol. 13, Issue: 9; pp. 3421-3429, DOI: 10.1109/JSEN.2013.2262934.*

Steering by Gazing: An Efficient Biomimetic Control Strategy for Visually Guided Micro Aerial Vehicles; Kerhuel, L.; Viollet, S.; Franceschini, N.; Robotics, IEEE Transactions on ; Year: 2010, vol. 26, Issue: 2; pp. 307-319, DOI: 10.1109/TRO.2010.2042537.*

Design and Control of a Compact High-Dynamic Camera-Orientation System; Villgrattner, T.; Ulbrich, H.; Mechatronics, IEEE/ASME Transactions on; Year: 2011, vol. 16, Issue: 2; pp. 221-231, DOI: 10.1109/TMECH.2009.2039223.*

Witt, H., et al.; Designing a Wearable User Interface for Hands-free Interaction in Maintenance Applications; Pervasive Computing and Communications Workshops, 2006; University of Bremen, Germany TZI Wearable Computing Group.

Ockerman, J.J. et al.; Preliminary Investigation of Wearable Computers for Task Guidance in Aircraft Inspection; 1998; ISWC '98 Proceedings of the 2nd IEEE International Symposium on Wearable Computers.

Taylor, M.; TATEM: Technologies & Techniques for New Maintence Concepts (Publishable Summary) 2008; TATEM: Proposal/Contract No. 502909.

Extended EP Search Report for Application No. 15196396. 4-1553 / 3029510 dated Aug. 4, 2016.

EP Examination Report for Application No. 15196396.4-1553 dated Aug. 28, 2017.

* cited by examiner

NEAR-TO-EYE DISPLAY SYSTEMS AND METHODS FOR VERIFYING AIRCRAFT COMPONENTS

TECHNICAL FIELD

The present invention generally relates to systems and methods for verifying the state of aircraft components, and more particularly to verifying the state of aircraft components by a near-to-eye device.

BACKGROUND

Pilots typically perform a check or inspection of certain exterior and interior component of an aircraft during a variety of phases of aircraft operation. An inspection may proceed in a variety of phases, such as, for example, an aircraft exterior inspection phase, an interior inspection phase, a cruise phase, and/or a landing phase. During each phase, a pilot may inspect one or more components of the aircraft to ensure that each component is in compliance with the pilot's checklist. For example, during an exterior inspection phase, a pilot may inspect one or more exterior components of the aircraft, such as the pilot tubes, spoilers, landing gear, rudders and the like. Similarly, during an interior inspection phase, a pilot may inspect a variety of internal instrumentation, componentry, cockpit features such as glareshield, overhead panels, pedestals, and the like.

It is not uncommon, however, that a pilot may overlook a particular component for inspection. For instance, a pilot may fail, during an interior inspection phase, to inspect (or to notice, even with inspection) that a component such as a speed brake lever is deployed in an incorrect position. Such an oversight can lead to a variety of undesirable circumstances.

Hence, there is a need for a system that provides a variety of visual cues or indicators for a pilot as the pilot performs the aircraft inspection. More particularly, there is a need for a wearable near-to-eye display ("NTE") display system through which a pilot or other operator may view one or more aircraft components, and which is capable of providing to the operator a variety of visual indications of the condition and/or state of each component within the operator's field of view.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems and methods are disclosed for verifying a vehicle component. In various embodiments, a system for verifying a vehicle component may comprise a near-to-eye (NTE) display system that includes an NTE tracking controller, a controller communicatively coupled to the NTE tracking controller, and a component database communicatively coupled to the controller. The controller may be configured to receive component data from the component database and communicate the component data to the NTE tracking controller based upon focus data, where the focus data is based upon a head position of an operator.

In various embodiments, a system for verifying a vehicle component may similarly comprise a near-to-eye (NTE) display system that includes an NTE tracking controller, a controller communicatively coupled to the NTE tracking controller, and a component database communicatively coupled to the controller. The controller may be configured to: (a) receive component data from the component database, and (b) communicate the component data to the NTE tracking controller based upon focus data and an inspection phase of the aircraft. The focus data may be based upon a head position of an operator and the inspection phase upon an operational phase of the aircraft. The operational phase of the aircraft may a takeoff phase, a cruise phase, and a landing phase.

Moreover, in various embodiments, a method for verifying a vehicle component may comprise receiving, by a controller, component data from a component database, communicating, by the controller, the component data to an NTE tracking controller based upon focus data, the focus data based upon a head position of an operator, and displaying, by a display communicatively coupled to the NTE tracking controller, the component data.

Furthermore, other desirable features and characteristics of the systems and methods disclosed herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, an "aircraft component" or "component" may comprise any portion of an aircraft. For example, a component may comprise any exterior portion of an aircraft, such as, for example, any external instrumentation, a pilot tube, a spoiler, landing gear, a rudder, and the like. A component may further comprise any interior portion of an aircraft, such as, for example, any internal instrumentation, componentry, cockpit features such as a glareshield, overhead panels, pedestals, and the like.

Figure 1:
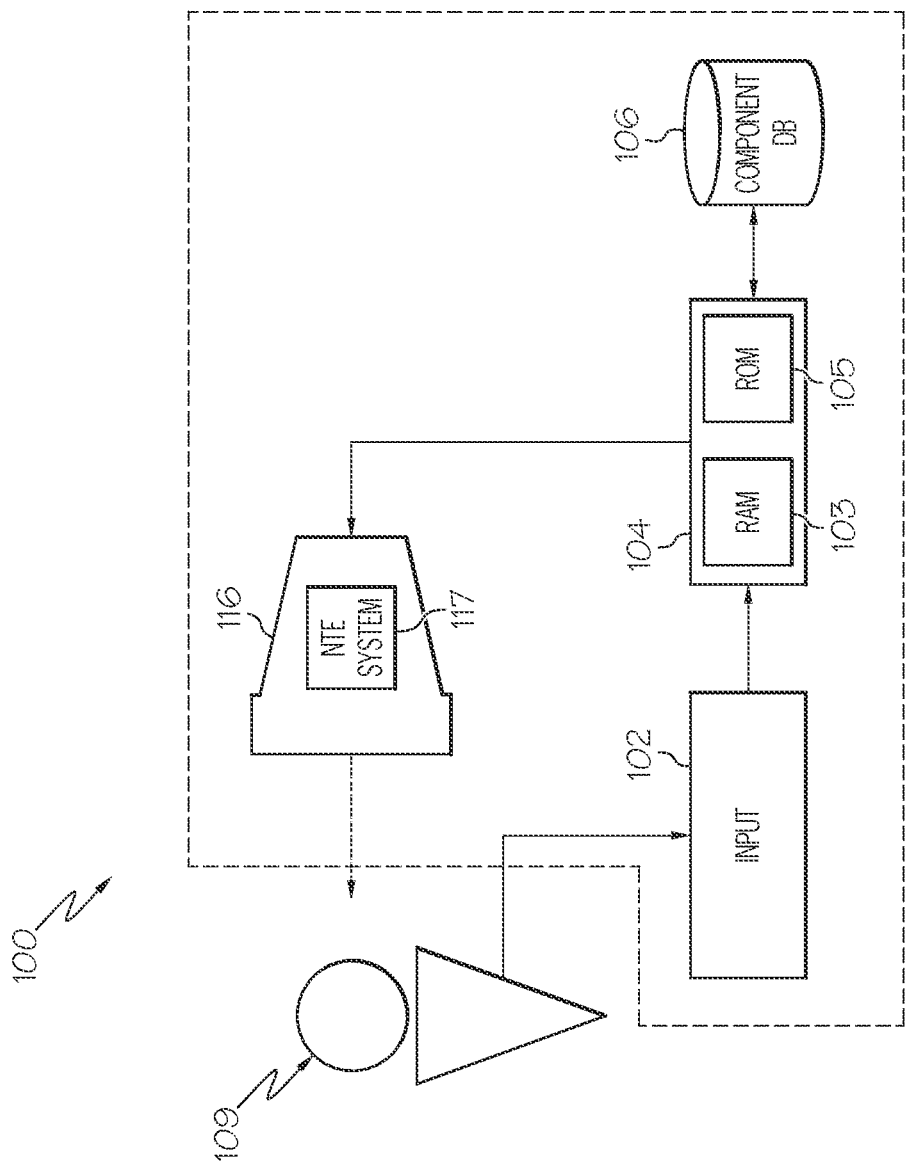
FIG. 1 illustrates, in accordance with various embodiments, a functional block diagram of a flight display system.

Referring to FIG. 1, a system 100 for verifying an aircraft component includes a user interface 102, a controller 104, one or more component databases 106 (including any of a variety of aircraft component information, as described above), external data sources, and one or more display devices 116 (including the NTE display system 117 subsequently discussed in more detail).

The user interface 102 is in operable communication with the controller 104 and is configured to receive input from an operator 109 (e.g., a pilot) and, in response to the operator 109 input, supplies command signals to the controller 104. The user interface 102 may be any one, or combination, of various known user interface devices including, but not limited to, one or more buttons, switches, knobs, and touch panels.

The controller 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein.

A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the controller 104 can include a variety of types of memory 103 and/or 105, for example, such as on-board RAM (random access memory) 103 and on-board ROM (read-only memory) 105.

The program instructions that control the controller 104 may be stored in either or both the RAM 103 and the ROM 105. For example, the operating system software may be stored in the ROM 105, whereas various operating mode software routines and various operational parameters may be stored in the RAM 103. The software executing the exemplary embodiment can be stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the controller 104 such that the controller 104 can be read information from, and write information to, the memory 103, 105. In the alternative, the memory 103, 105 may be integral to the controller 104. As an example, the controller 104 and the memory 103, 105 may reside in an ASIC. In practice, a functional or logical module/component of the system 100 might be realized using program code that is maintained in the memory 103, 105. For example, the memory 103, 105 can be used to store data utilized to support the operation of the system 100, as will become apparent from the following description.

No matter how the controller 104 is specifically implemented, it is in operable communication with, at least, the component database 106 and the display devices 116 The display devices 116, in response to the display commands, selectively render (as described more particularly below) various types of textual, graphic, and/or iconic information.

The component database 106 include various types of data representative of the various types of aircraft components, as described above, including locations, descriptions, visual and/or iconic depictions of aircraft components, appropriate states and/or conditions of various components during various aircraft operational phases, and the like.

The display devices 116, as noted above, in response to display commands supplied from the controller 104, selectively render various textual, graphic, and/or iconic information, and thereby supply visual feedback to the operator 109. It will be appreciated that the display devices 116 may be implemented using any one of numerous known display devices suitable for rendering textual, graphic, and/or iconic information in a format viewable by the operator 109. Non-limiting examples of such display devices include various flat panel displays such as various types of LCD (liquid crystal display), TFT (thin film transistor) displays, and projection display LCD light engines. The display devices 116 may additionally be implemented as a panel mounted display, or any one of numerous known technologies.

As previously noted, the display devices 116 include an NTE display system 117. There are many known NTE systems. One known example embodiment is described in U.S. patent application Ser. No. 12/707,293, which is hereby incorporated in its entirety by reference. Another known example embodiment is described in U.S. Pat. No. 8,218,006, which is hereby incorporated in its entirety by reference.

Figure 2:
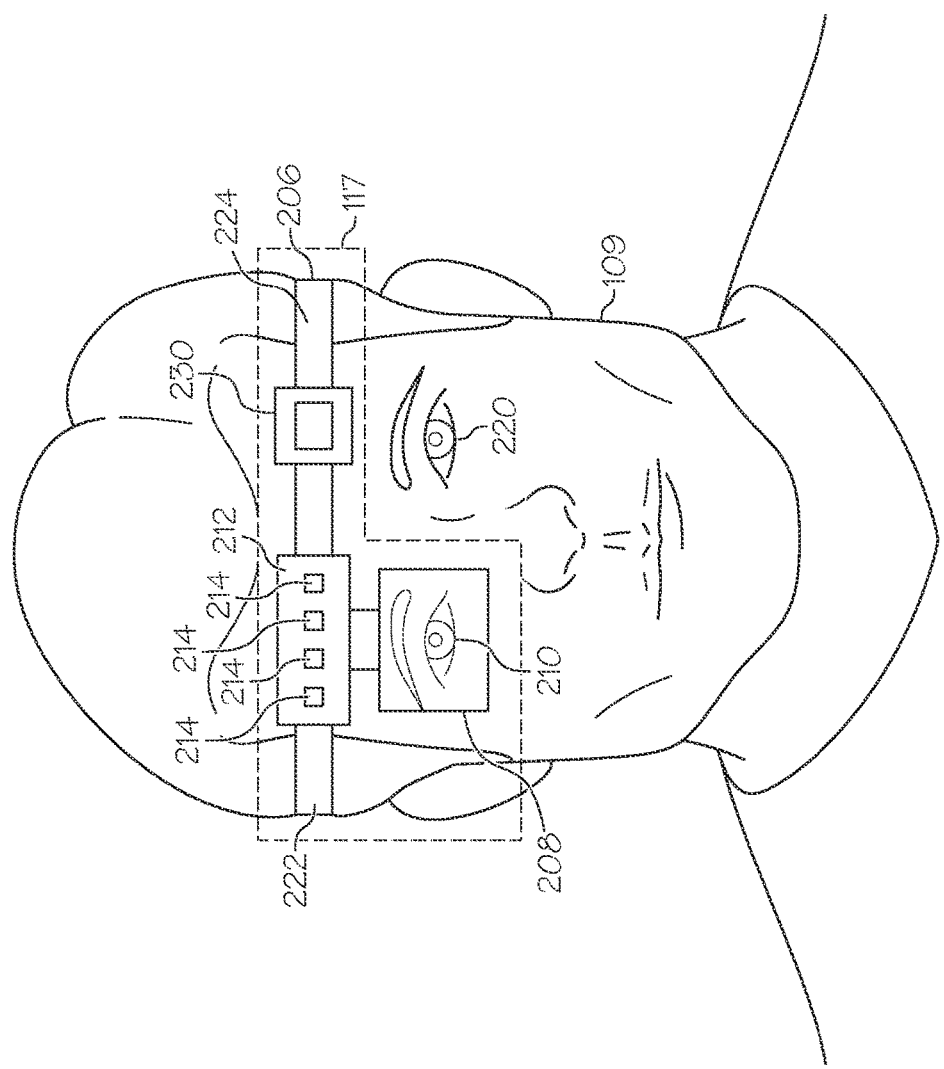
FIG. 2 illustrates, in accordance with various embodiments, an exemplary embodiment of a NTE display system.

As shown with respect to FIG. 2, the NTE display system 117 can interoperate with the operator 109 of a vehicle, such as a flight crew member of an aircraft, wearing (e.g., over the head of the operator 109) the NTE display system 117. The NTE display system 117 includes a headband 206 coupled to a NTE display 208, which preferably is semi-transparent. When correctly worn by the operator 109, the NTE display 208 is placed in the line of sight of the right eye 210 at a predetermined distance from the right eye 210.

In this manner, information can be presented to the operator 109 on the NTE display 208 superimposed on the visible scene beyond, for example, the components, such as controls and other items within the interior of the cockpit and/or without the exterior of the cockpit.

Infrared light emitting diodes (LEDs) 214 are located on a portion 212 of the headband 206 to sense a direction the head of the operator 109 is facing (e.g. turned up, turned down, turned at one portion of a cockpit or another portion)

at any point in time in order to present appropriate information on the NTE display 208. Other systems for tracking head movement include cameras or emitters on the headband, or the tracking system may be magnetic or inertial rather than optical.

The LEDs 214 can, in addition, be utilized to provide more detailed information about the state and actions of the operator 109. The NTE display system 117 is configured to monitor the head position of operator 109 by monitoring the position and orientation of the NTE display device (i.e., the NTE display system 117). In this manner, the operator's 109 head direction at any point in time can be sensed for generation and presentation of an appropriate transparent view including graphics and/or other information on the NTE display 208.

The NTE display system further includes an NTE image capturing device (e.g., a camera or video recorder) 230 that can capture one or more images of a component that the recording device is facing as the head of the operator 109 moves about the exterior and/or interior of the aircraft, changes orientation with respect to a variety of aircraft components, and the like. Thus, as the operator's 109 head direction is altered by the motion of the operator 109, the camera can capture one or more images of one or more aircraft components towards which the operator 109 is facing and/or, more particularly, upon which the operator 109 is focusing or which, in fact, are being inspected by the operator 109 (as determined as described herein).

The configuration of the NTE display system 117 is not limited to the device shown in FIG. 2. For example, while the NTE display system 117 is a monocular NTE display system, a binocular NTE display system could also be employed in the present embodiment. In addition, while the monocular NTE display system 117 in accordance with the present embodiment has the NTE display 208 situated over the right eye 210, the present embodiment could also use a monocular NTE display system having the display positioned in the line of sight of the left eye 220. And, the system could be biocular in which the same image is presented to both eyes, rather than binocular, in which slightly different images are presented to each eye in an attempt to create a stereoscopic pair of images that create a 3D experience for the user. Further, while the LEDs 214 are incorporated in the portion 212 of the headband 206, the number and location of the LEDs 214 can be anywhere on the headband 206, such as in portion 222 or portion 224.

The LEDs 214 are infrared in order to emit wavelengths not visible to the operator 109 and thereby not interfere with operation of the aircraft and/or the view of the operator 109. In addition, the LEDs 214 are positioned on the headband 206 to allow sensing of the position and orientation of the NTE display system 117 and the head of the operator 109. The present embodiment, however, is not limited to the use of infrared LEDs or, in fact, is not limited to the use of LEDs 214, and may include any reflective or emissive device attachable to the NTE display system 117 that would allow sensing of the position and orientation of the NTE display system 117 and, consequently, determination of the head direction of the pilot.

Figure 3:
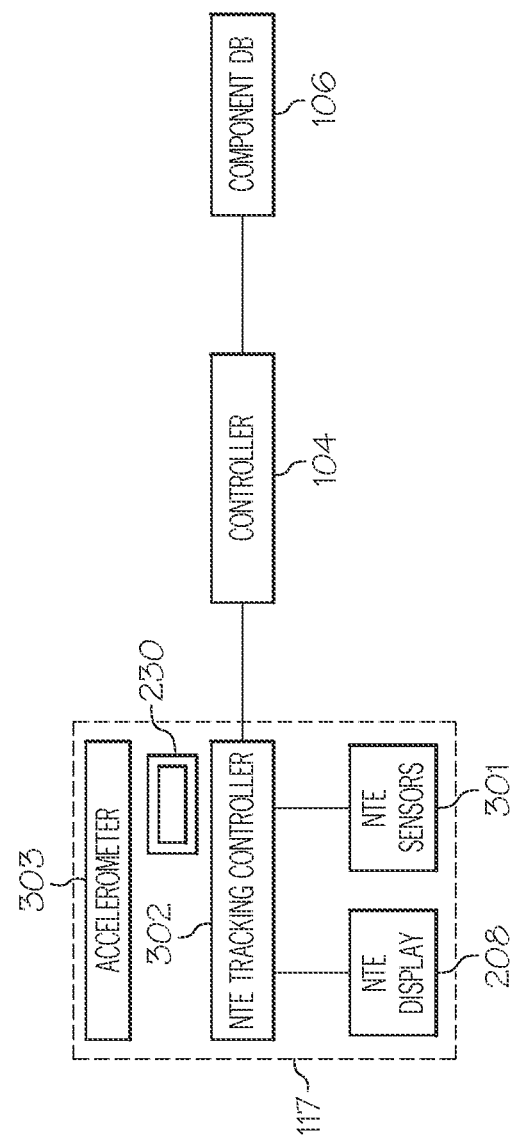
FIG. 3 illustrates, in accordance with various embodiments, a functional block diagram of the NTE display system of FIG. 2.

FIG. 3 depicts a block diagram of a system for verifying aircraft components in accordance with the present embodiment. The NTE display system 117 includes an NTE display 208, the NTE sensors 301 an NTE tracking controller 302 and an optional accelerometer 303. The NTE tracking controller 302 receives signals from the NTE sensors 301, such as NTE image capturing devices 230 or infrared sensors, and generates signals which are provided to the NTE display 208. The signals present appropriate information on the NTE display 208 for generating the view of graphics or other information for presentation to the operator 109.

The NTE tracking controller 302 also generates focus data corresponding to the direction of the head of the operator 109 in response to the information monitored by the NTE sensors 301, for example, whether the operator's 109 head is turned in the direction of a particular component or components such as at the in-cockpit displays, or at some other point of interest, such as an point of interest exterior to the aircraft. The NTE tracking controller 302 is coupled to a controller 104 for providing the focus data corresponding to the head direction of the operator 109. The focus data (e.g., the operator 109 head tracking data resulting from monitoring the position and orientation of the NTE display system 117) is utilized by the controller 104 in presenting images.

In an example embodiment, and as described in greater detail herein, data about a component is provided to the controller 104 and the NTE tracking controller 302 from the component database 106. The data provided by the controller 104 is converted to a graphic or indicator for presentation on the NTE display 208.

Figure 4:
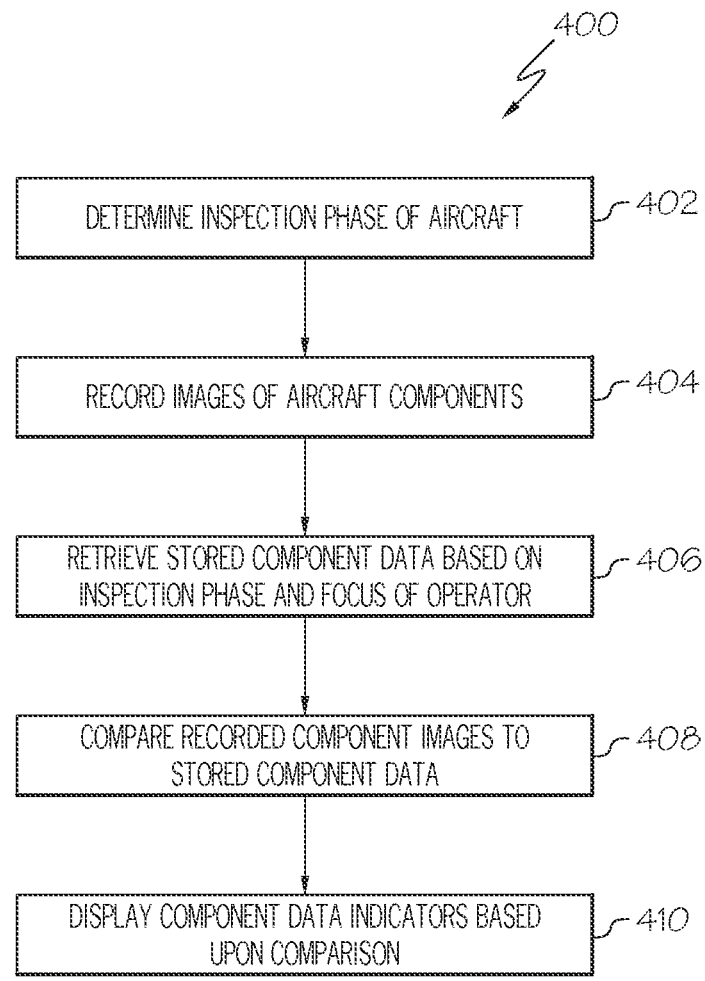
FIG. 4 illustrates, in accordance with various embodiments, a method for scanning an aircraft using an NTE display system.

In operation, and with respect to FIG. 4, a process 400 for verifying an aircraft component is shown. In general terms, an operator 109, such as a pilot, may perform a variety of aircraft inspections, including, for example, and as described herein, an exterior inspection of the aircraft, an interior inspection of the aircraft, an inspection during cruise or flight, such as a "cruise inspection") of the aircraft, and the like.

An inspection or inspection phase (e.g., exterior inspection, interior inspection, cruise inspection) is based upon a phase of operation of the aircraft. For instance, an aircraft may exist in a takeoff (or pre-flight) phase, a cruise (or flight) phase, a landing phase, a landed phase, and the like. During each phase of the operation of the aircraft, an operator 109 may perform an inspection that is related to or based upon that phase. For instance, during a takeoff or pre-flight phase, an operator 109 may perform a takeoff inspection. Similarly, during a cruise phase, an operator 109 may perform a cruise inspection, and during a landing or landed phase, an operator 109 may perform a landing inspection.

Each inspection can be associated with a variety of checklist tasks and/or stored component data. For example, during a takeoff interior inspection, it may be necessary or desirable that one or more aircraft components be in a particular configuration (e.g., during a takeoff phase and inspection, it may be important that an aircraft speed brake be disarmed or "down.") Likewise, during a takeoff exterior inspection, it may be necessary or desirable that one or more pilot tubes be unobstructed, or that one or more aircraft tires be at a desirable Psi.

Therefore, an operator 109 may perform the variety of exterior and interior inspections described herein during a variety of operational phases of the aircraft to check the state and/or condition of one or more components. To this end, with the aid of the system 100 (and in particular, with the aid of the NTE system 117 being worn over the head and at least one eye of the operator 109), the operator 109 can visually scan the exterior and/or interior during one or more inspection phases.

Accordingly, the system 100 (e.g., the controller 104) determines an operational or inspection phase of an aircraft by querying an aircraft system, such as a flight management system (step 402). Each inspection phase is associated with one or more stored exterior or interior component images or component data. These stored data or images show the one or more components in a proper (i.e., safe or correct) operational state or condition. The NTE image capturing device 230 records, as the operator 109 performs the visual scan and changes component focus, one or more images of the interior or exterior of the aircraft (step 404).

Based upon the determined inspection phase and operator 109 focus, the controller 104 retrieves a saved component image or component data that represents a desired or optimal state or condition of one or more components (step 406). The controller 104 can communicate the saved image to NTE tracking controller 302 or the controller 104 can receive the image recorded by the NTE image capturing device 230 from the NTE system 117. In either event, however, one of the controller 104 or the NTE tracking controller 302 compares the stored component image to the recorded component image (step 408). In response, the NTE tracking controller 302 communicates with the NTE display to instruct the NTE display 208 to display one or more component data indicators, as described below (step 410).

In various embodiments, the controller 104 or the NTE tracking controller 302 may instruct the NTE display 208 to display an indicator in response to a determination that a component is in an incorrect operational state or condition based upon the comparison, or the controller 104 or the NTE tracking controller 302 may instruct the NTE display 208 to display an indicator based simply upon the comparison—that is, even where a component is in a correct operational state or condition, the NTE tracking controller 302 may instruct the NTE display 208 to display one or more indicators with respect to one or more components being viewed by the operator 109. As shown with reference to FIGS. 5A-6C, and as described below, one or more indicators, any of which may include information that varies from specific (e.g., a specific tire pressure or a generalized indicator that tire pressure requires attention).

Figure 5A:
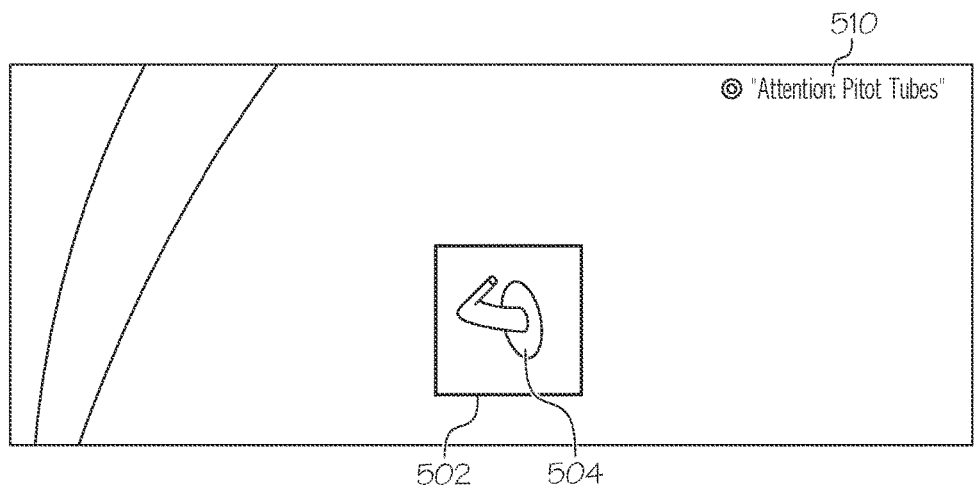
FIG. 5A illustrates, in accordance with various embodiments, an example of an indicator that can be displayed by an NTE display system for an operator during an exterior inspection phase based upon the head position of the operator.
Figure 5B:
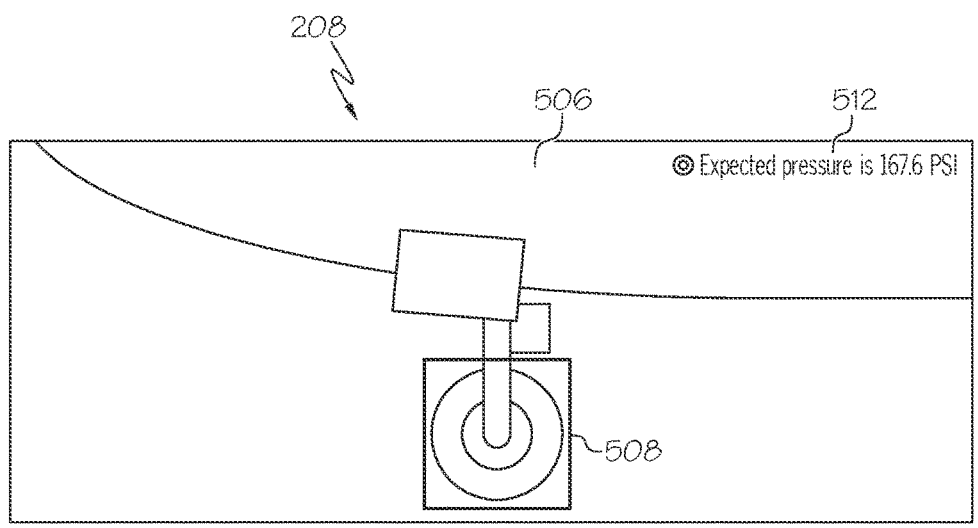
FIG. 5B illustrates, in accordance with various embodiments, an example of a second indicator that can be displayed by an NTE display system for an operator during an exterior inspection phase based upon the head position of the operator.

For instance, and with reference now to FIGS. 5A and 5B, during an exterior inspection, an operator 109 may be visually prompted by the system 100, via the NTE display 208, to check the status of an external component. As shown, for example, as the operator 109 is performing a visual inspection of the exterior of the aircraft, the controller 104 retrieves component data from the component database 106 that is relevant to the exterior of the aircraft (based upon the inspection phase) and communicates this component data to the NTE tracking controller 302. The NTE tracking controller 302, in turn, communicates a signal to the NTE display 208 to highlight a particular component.

As shown by the indicators 502 and 506, the NTE tracking controller 302 communicates a signal to the NTE display 208 that causes the NTE display 208 to highlight relevant exterior components, such as a pilot tube 504 and/or an aircraft tire 508. The NTE tracking controller 302 further communicates a signal to the NTE display that causes the NTE display 208 to display an instruction 510 and/or 512, such as somewhat specific indicator, such as "Check Pitot Tube Valve" and/or "Expected Pressure is 167.6 Psi," or a more generalized indicator, such as, "Attention: Low Tire Pressure," depending, for example, upon the exterior component being inspected.

Moreover, the NTE tracking controller 302 determines, based upon data received from the NTE sensors 301 and/or the accelerometer 303, the head position and/or visual focus of the operator 109 (the "focus" or "focus data"), and this focus data is utilized, as described herein, by the system 100 to determine a component that the operator 109 is viewing and, thereupon, based upon received component data, to provide relevant component data to the operator. Thus, as the focus of the operator 109 shifts about the exterior of the aircraft, the component data displayed for the operator 109 shifts and changes as well so that the operator 109 is able to perform an exhaustive and error-free visual inspection of the exterior of the aircraft without the aid of a checklist or quick reference manual.

Figure 6A:
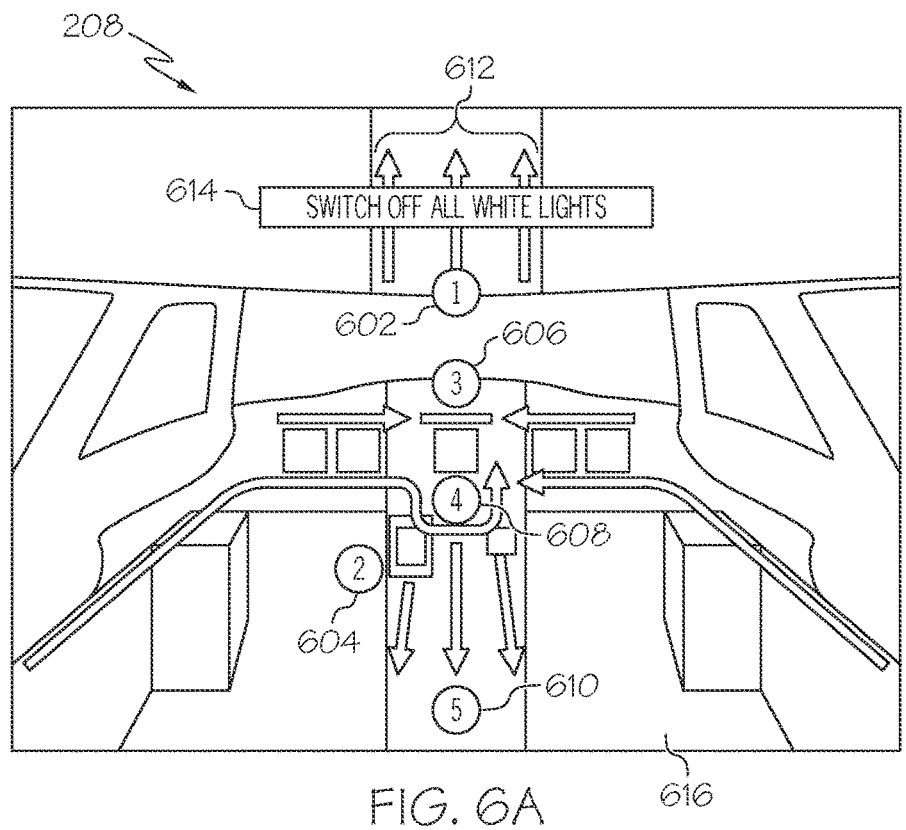
FIG. 6A illustrates, in accordance with various embodiments, an example of a variety of indicators that can be displayed by an NTE display system for an operator during an interior inspection phase based upon the head position of the operator.
Figure 6B:
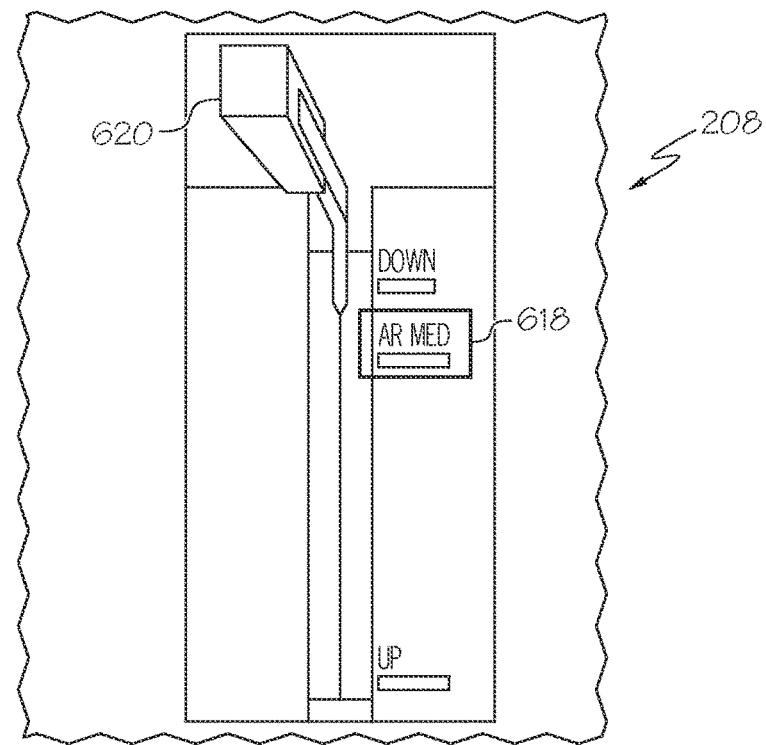
FIG. 6B illustrates, in accordance with various embodiments, an example of an indication provided by an NTE to an operator that a particular component is in the incorrect position for a particular inspection phase based upon a head position of the operator.
Figure 6C:
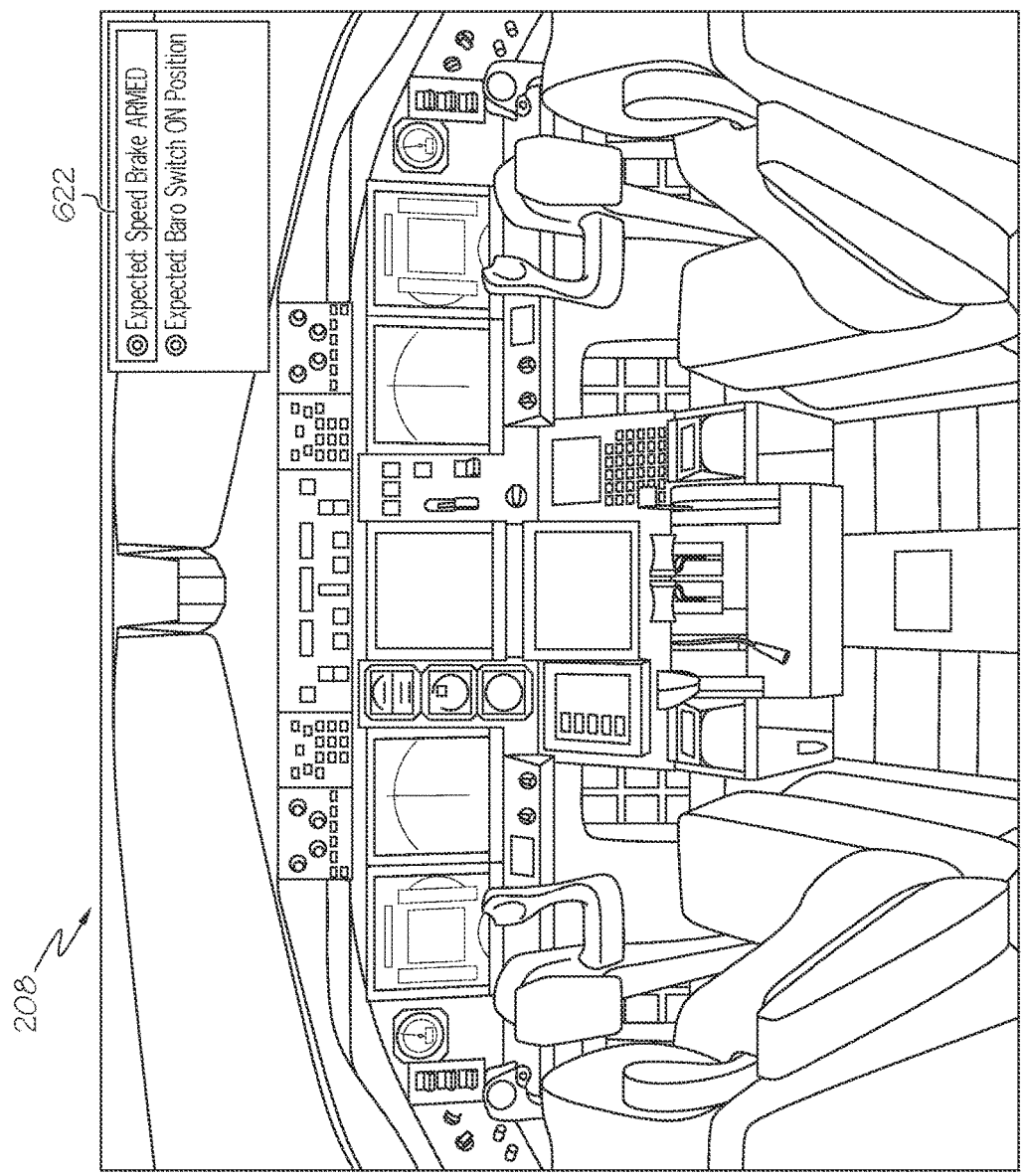
FIG. 6C illustrates, in accordance with various embodiments, an example of an indicator displayed for an operator by an NTE.

Similarly, and with reference now to FIGS. 6A, 6B, and 6C, an operator 109 performs a visual inspection of an interior of an aircraft in the manner that is described above with respect to the exterior inspection. For example, an operator 109 scans, by way of the NTE system 117, an interior portion of an aircraft, and, as the operator 109 scans the interior of the aircraft, the NTE system 117, as described above, determines the focus of the operator 109. Such a process is shown, for example, with particular regard to FIG. 6A, where, the operator 109 focuses first on the point 602, next on the point 604, and so forth through points 606, 608, and 610 until the operator 109 completes the interior scan. The NTE system may or may not display each number (1-5) associated with each point 602-610. However, as described above, the NTE system 117 determines the focus of the operator 109 (as the operator 109 moves from points 602-610 in any order) and display, as shown, component data associated with each point.

For example, as shown with regard to point 602, the NTE system 117 displays indicators (e.g., arrows 612) associated with a front panel and/or text providing instructions associated with the front panel (e.g., "Switch off all white lights"). Likewise, with respect to point 604, the NTE system 117 displays indicators and/or textual instructions, such as the arrows 616 indicating that a particular action should be performed with respect to the highlighted component (an APU unit in this case). Further, with respect to points 606, 608, and 610, the NTE system 117 can display any of a variety of visual or textual indicators associated with each respective component based, again, upon the determined focus of the operator 109 and the operational and/or inspection phase of the aircraft, as determined by the controller 104 or the NTE tracking controller 302. Moreover, as described herein, in response to these determinations, the controller 104 requests and receives relevant component data, which the NTE tracking controller 302 transmits as a visual indicator or indicators to the NTE display 208 for the operator 109 to view in real time.

Therefore, as shown with respect to FIG. 6B, any of a variety of visual and/or textual indicators, such as an indicator 618 surrounding a speed brake lever 620 that indicates that the speed brake lever 620 is in an incorrect and/or correct position or configuration based upon an operational and/or inspection phase of the aircraft can be displayed. Likewise, as shown with respect to FIG. 6C, an NTE tracking controller 302 can cause the NTE display 208 to display a textual list of expected conditions, such as "Expected: Speed Brake Armed," and/or "Expected: Baro Switch ON Position."

In summary, as described above, an operator 109 may engage with and utilize the system 100 to perform a variety of visual inspections of an exterior and/or interior of an aircraft and, based upon a determined focus of the operator 109 and stored and recorded aircraft component data or images, the system 100 can supply one or more visual indicators for the operator 109, thereby reducing the risk that the operator 109 may overlook a required component condition or state and so, in turn, improving the safety of the inspection performed by the operator 109 of the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for verifying an operational state of a vehicle component of a movable vehicle, the system comprising:
    a near-to-eye (NTE) display system that includes an NTE tracking controller and a display;
    a management system;
    a controller communicatively coupled to the NTE tracking controller and the management system; and
    a tangible, non-transitory, component database communicatively coupled to the controller, the component database having stored component data for a plurality of operational states of the vehicle component, each of the plurality of operational states associated with one of a plurality of different operational phases of the movable vehicle;
    the controller configured to query the management system to determine an actual operational phase of the movable vehicle;
    the controller configured to receive, from the component database, the stored component data for the one of the plurality of operational states associated with the actual operational phase of the movable vehicle;
    the controller configured to receive, from the NTE display system, actual component data for an actual operational state of the vehicle component based upon focus data of an operator;
    the controller configured to compare the actual component data to the stored component data for the one of the plurality of operational states; and
    the controller configured to control the display to output visual information based on the comparison of the actual component data and the stored component data.

2. The system of claim 1,
    wherein the controller is configured to output a control signal to the display of the NTE display system, the display configured to display an indicator based on the comparison of the actual component data and the stored component data.

3. The system of claim 2,
wherein the component database has stored image data for the plurality of operational states of the vehicle component;
wherein the controller is configured to receive, from the component database, the stored image data for the one of the plurality of operational states associated with the actual operational phase of the movable vehicle;
wherein the controller is configured to receive, from the NTE display system, actual image data for the actual operational state of the vehicle component;
wherein the controller is configured to compare the actual image data to the stored image data; and
wherein the controller is configured to output the control signal to the display of the NTE display system, the display configured to display the indicator based on the comparison of the actual image data to the stored image data.

4. The system of claim 1, wherein the NTE tracking controller is configured to determine the focus data based upon the head position of the operator.

5. A system for verifying an operational state of an aircraft component of an aircraft, the system comprising:
a near-to-eye (NTE) display system that includes an NTE tracking controller and a display;
a flight management system;
a controller communicatively coupled to the NTE tracking controller and the flight management system; and
a tangible, non-transitory, computer-readable, component database communicatively coupled to the controller,
wherein the component database has stored component data for a plurality of operational states of the aircraft component, each of the plurality of operational states associated with one of a plurality of different operational phases of the aircraft; and
wherein the controller is configured to:
query the flight management system to determine the actual operational phase of the aircraft is one of a takeoff phase, a cruise phase, and a landing phase;
receive, from the component database, the stored component data for the one of the plurality of operational states associated with the actual operational phase of the aircraft;
receive, from the NTE display system, actual component data for an actual operational state of the aircraft component based upon focus data, the focus data based upon a head position of an operator;
compare the actual component data to the stored component data for the one of the plurality of operational states; and
control the display to output visual information based on the comparison of the actual component data and the stored component data.

6. The system of claim 1, wherein the movable vehicle is an aircraft;
wherein the management system is a flight management system; and
wherein the controller is configured to query the flight management system to determine the actual operational phase is one of a takeoff inspection phase, a cruise inspection phase, and a landing inspection phase of the aircraft.

7. The system of claim 1,
wherein the movable vehicle has an inspection phase as one of the plurality of different operational phases;
wherein the controller is configured to query the management system to determine that the actual operational phase of the movable vehicle is the inspection phase; and
wherein the NTE display displays visual information to the operator based upon the determination of the inspection phase of the vehicle.

8. The system of claim 1, wherein the movable vehicle is an aircraft, and wherein the plurality of different operational phases of the aircraft includes at least one of a takeoff phase, a cruise phase, and a landing phase of the aircraft.

9. The system of claim 7, wherein the movable vehicle is an aircraft, wherein the inspection phase of the aircraft comprises at least one of an aircraft exterior inspection phase, an aircraft interior inspection phase, an aircraft cruise phase, and an aircraft landing phase.

10. The system of claim 1, wherein the vehicle component is one of a plurality of vehicle components of the movable vehicle;
wherein the component database has stored component data for each of the plurality of vehicle components;
wherein the controller is configured to determine which of the plurality of vehicle components that the operator is looking at based on the focus data; and
wherein the controller is configured to receive, from the component database, the stored component data based on the determination of which of the plurality of vehicle components that the operator is looking at.

* * * * *